United States Patent [19]

Nobuta

[11] Patent Number: 4,876,604
[45] Date of Patent: Oct. 24, 1989

[54] APPARATUS FOR COMMUNICATING IMAGE DATA OF DIFFERENT RESOLUTIONS

[75] Inventor: Hiroshi Nobuta, Yokohama, Japan

[73] Assignee: Canon Kabushiki Kaisha, Tokyo, Japan

[21] Appl. No.: 177,350

[22] Filed: Apr. 1, 1988

[30] Foreign Application Priority Data

Apr. 15, 1987 [JP] Japan .................................. 62-90877

[51] Int. Cl.⁴ .......................... H04N 1/00; H04N 1/40
[52] U.S. Cl. .................................... 358/400; 358/434; 358/443
[58] Field of Search ............... 358/256, 257, 280, 282, 358/284

[56] References Cited

U.S. PATENT DOCUMENTS

| 4,068,266 | 1/1978 | Liao ..................................... 358/256 |
| 4,644,409 | 2/1987 | Fuchs ................................... 358/257 |
| 4,652,934 | 3/1987 | Muroya et al. ...................... 358/260 |
| 4,658,299 | 4/1987 | Tanaka et al. ....................... 358/256 |
| 4,679,096 | 7/1987 | Nagashima . |
| 4,746,986 | 5/1988 | Tanigawa ............................. 358/256 |
| 4,772,955 | 9/1988 | Kurahayashi et al. . |
| 4,796,092 | 1/1989 | Ogata . |

Primary Examiner—Edward L. Coles, Sr.
Assistant Examiner—Kim Yen Vu
Attorney, Agent, or Firm—Fitzpatrick, Cella, Harper & Scinto

[57] ABSTRACT

Apparatus used for processing facsimile image data of different resolutions. The apparatus includes a memory for storing received image data, circuits for supplying first and second image data of different resolutions to the memory and an image resolution converter arranged in the supply circuits for unifying the resolution of the data stored in the memory. A switch arrangement is provided for directing the image data of selected resolution among the elements.

20 Claims, 2 Drawing Sheets

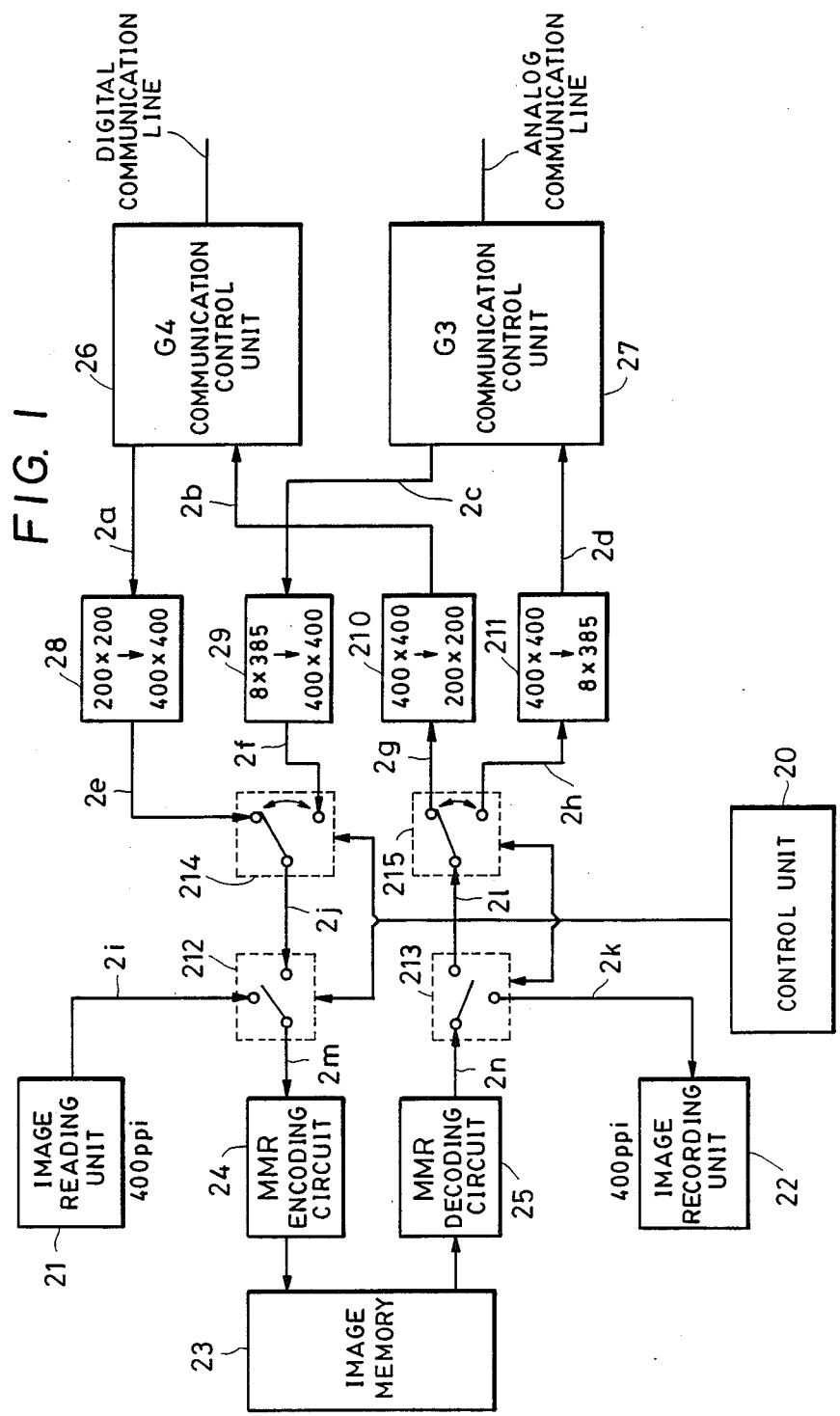

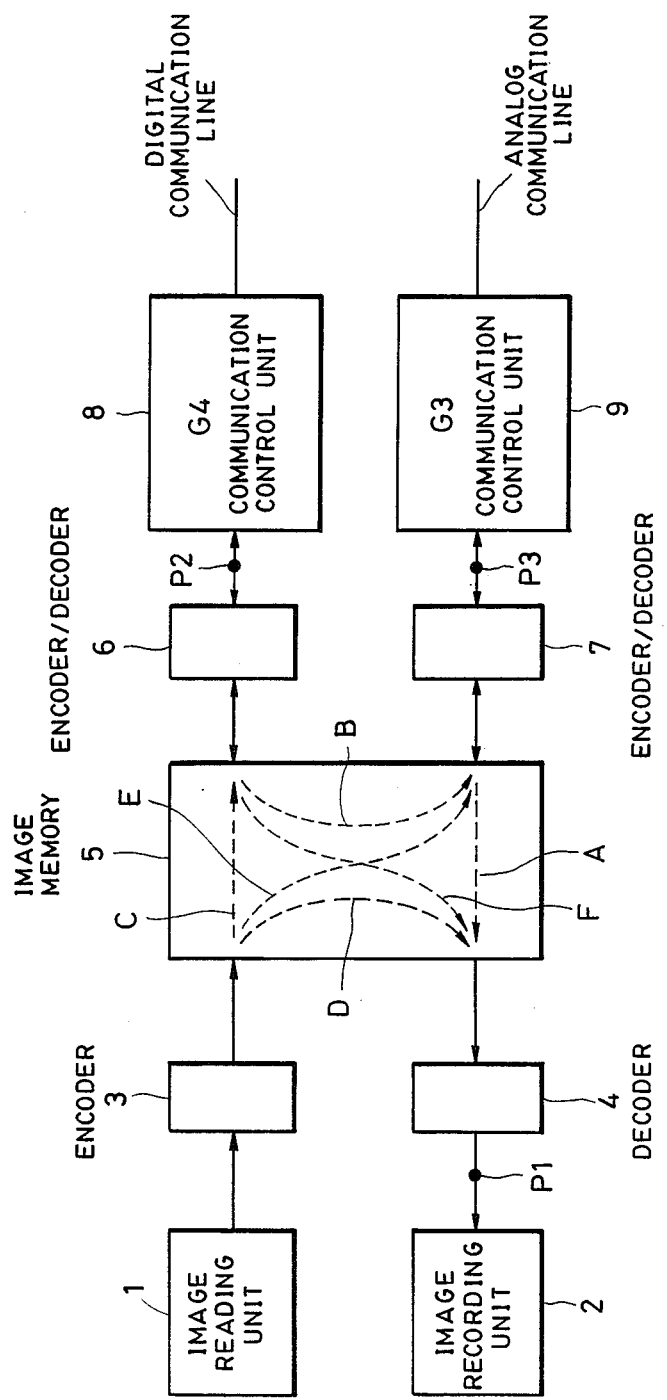

APPARATUS FOR COMMUNICATING IMAGE DATA OF DIFFERENT RESOLUTIONS

BACKGROUND OF THE INVENTION

1. Field of the Invention

The present invention relates to image communication apparatus which has at least one of communication control unit for receiving and transmitting image data of different resolutions on at least one communication line and which also has an image memory for storing image data to be transmitted.

2. Description of the Prior Art

The CCITT (International Telegraph and Telephone Consulting Committee of the International Telecommunications Union) recommends several standard facsimile apparatuses, including: Group 1 (G1), Group 2 (G2), Group 3 (G3) and Group 4 (G4). Facsimile apparatus of the G1, G2 and G3 type use public analog telephone lines, whereas facsimile apparatus of the G4 type mainly use digital communication lines.

Picture element density or image resolution is different between G3 and G4 types of facsimile apparatus. The standard picture element density used in the G3 type is 8 pels. (picture elements)/mm (millimeter) in the main scanning direction, and 3.85 pels/mm sub scanning direction. On the other hand, the picture element density of the G4 type facsimile apparatus is 200 pels/inch (7.87 pels/mm) in both the main and sub scanning directions.

A standard encoding/decoding method known as the MH (Modified Huffman) method, is generally used for encoding and decoding image signals in a G3 type facsimile apparatus whereas a method known as MMR (Modified Modified READ) is generally used for encoding and decoding image signals in a G4 type facsimile apparatus.

Applicants have previously proposed facsimile apparatus which has both G3 and G4 facilities. FIG. 2 shows the block diagram of such dual function facsimile apparatus. As shown in FIG. 2 there is provided an image reading unit 1 for reading an original image to be transmitted. The reading unit 1 reads the original image and converts the original image to an image signal. There is also provided an image printing unit 2, for example a thermal printer, which prints an image corresponding to a received image signal.

The facsimile apparatus of FIG. 2 also includes a digital communication control unit 8. This control unit connects the apparatus with digital communication lines; and it controls communications in the manner of a G4 facsimile apparatus with encoding/decoding according to the MMR method. The apparatus of FIG. 2 also includes an analog communication control unit 9 which connects the apparatus with an analog communication line, for example a telephone line; and carries out modulation/demodulation and encoding/decoding according to the MH method.

There is also provided a reading unit 1 and a printing unit 2 which are connected to an image memory 5 via, respectively, an encoding circuit 3 and a decoding circuit 4. The G4 communication control unit 8 and the G3 communication control unit 9 are connected via the encoding/decoding circuits 6 and 7, respectively, to the image memory 5.

The image memory 5 is a random access memory device, for example a semiconductor device or a hard-disc apparatus.

The above described units are controlled by a control unit (not shown) such as a microprocessor or the like.

The apparatus shown in FIG. 2 transmits an image signal, read from an original by the reading unit 1, to an analog or digital communication line via the analog or digital communication control unit 8 or 9. The signal from the reading unit 1 is communicated through the path E or C in the memory 5 shown in FIG. 2. The apparatus of FIG. 2 also supplies the recording Unit 2 with an image signal from an analog or digital communication line. The image signal is received by the analog or digital communication unit 8 or 9, and is supplied through the memory 5. The signal to the printing unit is communicated through the path A or F in the memory 5 shown in FIG. 2. In addition, image signals may be transmitted directly from the reading unit 1 to the printing unit 2 through a path D in the memory 5; and image signals may be transmitted between an analog and a digital communication line through the communication control units 8 and 9 and a path B in the memory 5.

Generally, in the above-described transfer of image data, in order to make efficient use of the image memory 5, the memory is arranged to store the image data as encoded by the encoding circuit 3 and the encoding/decoding circuits 6 and 7.

It does not matter which one of the above-mentioned coding processes (i.e. MH or MMR) is used by the encoding circuit 3, the decoding circuit 4 and the encoding/decoding circuit 6 and 7.

The differences between the G3 and G4 type communication control units involve not only their respective encoding methods, but also the image resolution. For example, the image resolution of the reading unit 1 and the printing unit 2 in both the main and the sub-scanning directions is generally 400 ppi (picture elements per inch), which is available for both the G3 and G4 type information processing. In this case, the image data obtained by the reading unit 1 may be sent to the printing unit 2 through the path D in the image memory 5, and the image data is copied. Here the size of the read image is the same as the size of the printed or reproduced image.

However, the image resolution of the G3 type image data from the analog communication line which is received via the communication control unit 9 is, as above mentioned, 8 pel/mm in the main scanning direction and 3.85 pel/mm in the sub scanning direction (i.e. 8×3.85 pel/mm). Therefore the image resolution of the printing unit 2 is larger than that of the G3 type image data, so that the G3 image data obtained via the path A should be reduced in both the main and sub scanning directions. Similarly, when a relaying operation from the analog line to the digital line is carried out through the path B, the image resolution of the G3 image data should be converted to compensate for the difference between the resolution of the G3 image data and that of the G4 image data.

When the read image data is to be transmitted via the communication control unit 8 to the G4 digital data line, the image resolution of the G4 image data must be half of that of the reading unit 1; and accordingly the resolution of the image data read by the reading unit 1 must be halved. Also, when the image data read by the reading unit 1 is to be transmitted via the communication control unit 9 to the G3 analog date line, the resolution of the image data read by the reading units should be also converted.

As can be appreciated from the foregoing, because the system of FIG. 2 inputs and outputs image data or different image resolution, it is necessary to provide image resolution converting circuits at several positions shown by P1, P2 and P3, in order to communicate between all the combinations of apparatus which operate with different image resolutions. Therefore, the structure of the above-described system is complicated and costly.

SUMMARY OF THE INVENTION

The present invention overcomes the above described problem by providing an image communication apparatus which has a memory for storing image data and which comprises image data supply means for supplying first and second image data of different resolutions, respectively, and an image data resolution converter connected between the image data supply means and the memory to convert the resolution of at least one of the first and second image date such that the resolution of the first and second image data supplied to the memory is unified.

Because of the novel arrangement of the present invention wherein the resolution of the image data to the memory is unified, the density of the picture elements is at a fixed predetermined value whenever image data is input to the image memory and whenever image data is output from the image memory. Consequently, the image data may always be processed by the same method in spite of the different communication facilities which communicate image data of different resolutions. Thus, the overall structure of the apparatus is simplified.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures or methods for carrying out the several purposes of the invention. It is important, therefore, that the claims be regarded as including such other constructions and methods as do not depart from the spirit and scope of the invention.

BRIEF DESCRIPTION OF THE DRAWINGS

One embodiment of the invention has been chosen for purposes of illustration and description, and is shown in the accompanying drawings forming a part of the specification, wherein:

FIG. 1 is a block diagram of a facsimile apparatus according to the present invention; and FIG. 2 is a block diagram of a conventional facsimile apparatus.

DETAILED DESCRIPTION OF THE PREFERRED EMBODIMENT

The facsimile apparatus of FIG. 1 incorporates both G3 and G4 communication facilities. As shown in FIG. 1, there is provided an image memory 23 for storing an image data which is to be input to and output from the apparatus. The image memory 23 may comprise a RAM (random access semiconductor memory) or a hard disc memory apparatus, both of well known conventional design. An encoding circuit 24 is provided for encoding by a predetermined encoding method (i.e. MMR type in the illustrated embodiment) the image data for storage in the image memory 23. A decoding circuit 25 is provided for decoding the image data output from the image memory 23. The resolution of the image data in the image memory 23 is unified at 400 ppi. Thus, the image data in the image memory 23 is MMR encoded and has a resolution of 400 ppi. The encoding and decoding circuit 24 and 25 are well known per se and accordingly are not described in further detail.

In this present embodiment there are also provided, as inputting/outputting devices to the image memory 23, an image reading unit 21, an image printing unit 22, a communication control unit 27 for G3 type communication and a communication control unit 26 for G4 type communication. The reading and printing units 21 and 22 are also well known and are therefore not described in further detail herein.

The image reading unit 21 and the image printing unit 22 have an image resolution of 400 ppi. Therefore, it is possible to connect the image reading unit 21 directly to the encoding circuit 24 and to connect the image printing unit 22 directly to the decoding circuit 25.

On the other hand, the image resolutions of G3 and G4 type communication are different from the 400 ppi resolution of the reading and printing units 21 and 22. Therefore, in the case of inputting or outputting between the image memory 23 and the communication control units 26 or 27, it is necessary to convert the image resolution. For this purpose image resolution converters 28, 29, 210 and 211 are provided. As shown, the control unit 26 sends received image data signals to the image resolution converter 28 via a signal line 2a, and the control unit 27 sends received image data signals to the image resolution converter 29 via a signal line 2c. Also the control unit 26 receives image data signals to be transmitted via a signal line 2b from the image resolution converter 210 and the control unit 27 receives image data signals to be transmitted via a signal line 2d from the image resolution converter 211.

The image resolution converters 28, 29, 210 and 211 convert the resolution of binary image data which is not encoded. Firstly, the image resolution converter 28 converts the 200×200 ppi image resolution of the G4 type communication to a 400×400 ppi image resolution. Therefore, for example, one input picture element is converted to two output picture elements in the main and subsidiary scanning directions.

The image resolution converter 29 converts the 8×3.85 pels/mm resolution of the G3 type communication to the 400×400 ppi image resolution. In this case, for example, one input picture element is converted to two output picture elements, and one element of every 64 output picture elements is deleted in the main scanning direction. In the subsidiary scanning direction, one line of input image signals is converted to four lines of output image signals, and one line of output image signals are added at every 180 lines of output image signals. The added one-line image signals are the same as those of the line which is just prior to this line.

The image resolution converter 210 converts the 400×400 ppi image data to the 200×200 ppi image data of the G4 type communication. Therefore, two input picture elements are converted into one output picture element in both of the main and subsidiary scanning directions. The image resolution converter 211 converts the 400×400 ppi input image data to 8×3.85 pels/mm output image data. Therefore, two input picture elements are converted to one output picture elements except that two input picture element are converted to two output picture elements every 63 input picture elements.

The above-described image resolution converters, respectively, comprise line memories, and counters for controlling the input or output image data to the line memories or from the line memories. These devices are well known per se and accordingly are not described in further detail herein.

Four switches, 212–215, for example analog switches, connect the image reading unit 21, the image printing unit 22, the encoding circuit 24, the decoding circuit 25 and the image resolution converters 28, 29, 210 and 211.

Each of the switches 212–215 connects a selected input or output apparatus to the image memory 23.

As can be seen, the switch 212 has a common terminal connected via a signal line 2m to the encoding circuit 24, which the switch 213 has a common terminal connected via a signal line 2n to the decoding circuit 25.

A control unit 20, which includes a micro processor, a memory and well known associated elements, controls the switches 212–215.

In the embodiment of FIG. 1, the image data is in all cases input or output by using one of the image reading unit 21, image printing unit 22, and the communication control units 26 and 27; and the image data must be buffered in the image memory 23. The image resolution of the image data in the image memory 23 is always 400×400 ppi; and the image data in the image memory 23 is MMR encoded.

In the case of reading an image, the switch 212 is changed over to a signal line 2i, so that the image reading unit 21 is connected to the encoding unit 24. Therefore the 400×400 ppi image data read by the image reading unit 21 is MMR encoded and is stored in the image memory 23.

Also, in the case of transmitting image data in accordance with G4 type communication, the switch 213 is changed over to connect a signal line 2n to a signal line 21, and the switch 215 is changed over to connect the signal line 21 to a signal line 2g. Therefore, the image data read out from the image memory 23 is decoded by the decoding circuit 25, and converted to 200×200 ppi image data by the image resolution converter 210. The 200×200 ppi image data is input to the communication control unit 26, and the communication control unit 26 transmits the image data to the digital communication line in accordance with G4 type communication.

On the other hand, in the case of transmitting image data in accordance with G3 type communication, the switch 215 is changed over to the signal line 2h in order to connect the image memory 23 to the G3 communication control unit 27 via the decoding circuit 25 and the image resolution converter 211. Therefore the image data decoded by the decoding circuit 25 is converted to 8×3.85 pels/mm image data by the image resolution converter 211, and is transmitted to the analog communication line via the communication control unit 27.

In the case of inputting G3 type image data received via the communication control unit 27 to the image memory 23, the switch 214 is changed over to a signal line 2f, and the switch 212 is changed over to a signal line 2j. Therefore the received image data from the communication control unit 27 is input to the image memory 33 via the image resolution converter 29 and the encoding circuit 24. Consequently, the image data stored in the image memory has 400×400 ppi image resolution and is MMR encoded.

In the case of receiving image data in accordance with G4 type communication, the switch 214 is changed over to the signal line 2e, so that the received image data is input to the image memory 23 via the communication control unit 26, the image resolution converter 28 and the MMR encoding circuit 24. Consequently, the received the image data is converted to 400×400 ppi image data, is encoded, and is stored in the image memory 23. Further, in the case of printing image data which had been input to the image memory 23 from the image reading unit 21 and/or the communication control unit 26 or 27, the switch 213 is changed over to a signal line 2k, so that he output of the decoding circuit 25 is applied directly to the image printing unit 22. As a result the decoded image data is printed by the printing unit 22 without being converted.

Image data received via either G3 (analog) communication control unit 27 or G4 (digital) communication control unit 26 and stored in the image memory 23 can be transmitted or relayed via either G4 (digital) communication control unit 26 or G3 (analog) communication control unit 27.

It will be understood that the switches 212, 213, 214 and 215 are shown in FIG. 1 as mechanical switches only for purposes of explaining the principles and operation of the invention and that in actual practice the switching may be accomplished electronically, for example by means of solid state integrated circuit elements, e.g. multiplexer.

It should be understood that some G4 type image communication facilities have a resolution of 400×400 ppi, which is the same as that of the other image data to be supplied to the image memory 23. In this case the image converter 28 and 210, shown if FIG. 1, would be eliminated.

As described above, image resolution is unified in all cases of data input to the image memory 23 or data output from the image memory 23. Therefore, the hardware structure of the facsimile apparatus and the control for changing over the switches can easily be simplified. Further more, the resolution of the image data in the image memory is greater than that of both the G3 and G4 type communication, so that the image data can be transmitted and/or received with high quality by the both type of communication without deteriorating the original image quality.

As also described in detail above, the present invention provides an image communication apparatus which has the image memory for storing the image data to be transmitted and which comprises a plurality of communication control units for respectively transmitting and/or receiving image data by different communication facilities. The apparatus also comprises control means for unifying resolution of the image data to be stored in the image memory. Therefore the image data can be input and/or output with high and homogeneous quality and facility irrespective of how it is selected. Also, by means of the present invention, the structure of a facsimile apparatus capable of handling different types of communication can be simplified and made less costly than prior art devices.

Although a particular embodiment of the invention is herein disclosed for purposes of explanation, various modifications thereof, after study of this specification, will be apparent to those skilled in the art to which the invention pertains.

I claim:

1. An image communication apparatus for processing image data of different resolutions, said apparatus comprising:
a memory for storing image data;
image data supply means for supplying first and second image data of different resolutions, respectively; and
an image data resolution converter for converting the resolution of at least one of said first and second image data such that the resolution of the first and second image data supplied to said memory is unified.

2. An image communication apparatus according to claim 1 further comprising a switch connected between said image data supply and said memory to selectively apply said first and second image data to said memory.

3. An image communication apparatus according to claim 1 wherein said image data supply includes an image reading unit for producing said first image data and a data communication control unit for receiving said second image data.

4. An image communication apparatus according to claim 1 further comprising an image reading unit arranged to be connected to said memory, said reading unit being constructed to communicate image data of the same resolution as supplied by said image resolution converter.

5. An image communication apparatus according to claim 1, further comprising a printing unit for printing the image data provided from said image memory, said printing unit being constructed to communicate image data of the same resolution as supplied by said resolution converter.

6. An image communication apparatus according to claim 1 wherein said image data supply comprises a plurality of communication control units for receiving and transmitting image data of different resolution on different communication lines.

7. An image communication apparatus according to claim 6 further comprising a switch connected between said memory and said image resolution converter to selectively apply signals from different ones of said communication control units to said memory.

8. An image communication apparatus according to claim 6, further comprising an image reading unit arranged to be connected to said memory, said reading unit being constructed to communicate image data of the same resolution as supplied by same image resolution converter.

9. An image communication apparatus according to claim 8 further comprising a switch arrangement connected between said memory and said image resolution converter to selectively apply signals from different ones of said communication control units and said image reading unit to said memory.

10. An image communication apparatus according to claim 9 wherein said switch arrangement comprises a first switch arranged to switch said memory alternatively between different ones of said communication control units.

11. An image communication apparatus for processing image data of different resolutions, said apparatus comprising:
a memory for storing image data;
image data supply means for supplying first and second image data of different resolutions, respectively, said image data supply means comprising a plurality of communication control units for receiving and transmitting image data of different resolution on different communication lines;
an image data resolution converter connected between said image data supply means and said memory to convert the resolution of at least one of said first and second image data such that the resolution of the first and second image data supplied to said memory is unified;
an image reading unit arranged to be connected to said memory, said reading unit being constructed to communicate image data of the same resolutions are supplied by said image resolution converter; and
a switch arrangement connected between said memory and said image resolution converter to selectively apply signals from different ones of said communication control units and said image reading unit to said memory,
wherein said switch arrangement comprises a first switch arranged to switch said memory alternatively between different ones of said communication control units, and a second switch between said first switch and said memory and arranged to switch said memory alternately between said image reading unit and said first switch.

12. An image communication apparatus according to claim 6 wherein at least one of said communication control units is constructed to receive and transmit image data signals on a communication line and wherein said one communication control unit has a first signal line connected to transmit to said memory, image data received from said communication line and a second signal line connected to receive from said memory, image data to be transmitted on said communication line and wherein said image resolution converter is connected along said first signal line.

13. An image communication apparatus according to claim 12 wherein a further image resolution converter is connected along said second signal line.

14. An image communication apparatus for processing image data of different resolutions, said apparatus comprising:
an image reader for producing first image data;
communication means for receiving and transmitting second image data having a resolution different from that of the first image data from said image reader;
memory means for storing image data from said image reader and said communication means; and
image data resolution converting means for converting the resolution of the second image data from said communication means such that the resolution of the second image data that is supplied to said memory means is coincident with the resolution of the first image data from said image reader.

15. An image communication apparatus according to claim 14, further comprising a printing unit for printing the image data provided from said image memory, said print unit being constructed to process image data of the same resolution as that provided by the image reader.

16. An image communication apparatus for processing image data of different resolutions, said apparatus comprising:
a memory for storing image data;

image data supply means for supplying first and second image data of different resolutions, respectively;

a printing unit for printing the image data provided from said image memory; and image data resolution converting means for converting the resolution of at least one of said first and second image data such that the resolution of the first and second image data supplied to said memory is coincident with a resolution of image data which is processed by said printing unit.

17. An image communication apparatus according to claim 16, wherein said image data supply means includes an image reading unit for producing said first image data and a data communication control unit for receiving said second image data.

18. An image communication apparatus according to claim 16, further comprising an image reading unit arranged to be connected to said memory, said reading unit being constructed to communicate image data of the same resolution as supplied by said image resolution converter.

19. An image communication apparatus according to claim 16, wherein said image data supply comprises a communication control unit for receiving image data of different resolutions.

20. An image communication apparatus according to claim 19, further comprising an image reading unit connectable to said memory, said reading unit being constructed to communicate image data of the same resolution as supplied by said image resolution converter.

* * * * *

UNITED STATES PATENT AND TRADEMARK OFFICE
CERTIFICATE OF CORRECTION

PATENT NO. : 4,876,604
DATED : October 24, 1989
INVENTOR(S) : HIROSHI NOBUTA

It is certified that error appears in the above-identified patent and that said Letters Patent is hereby corrected as shown below:

COLUMN 2

Line 68, "G3 analog date line," should read
            --G3 analog data line,--.

COLUMN 3

Line 22, "date" should read --data--.

COLUMN 5

Line 22, "which" should read --while--.

COLUMN 7

Line 35, "said resolu-" should read
            --said image resolu---.
    Line 52, "same image resolu-" should read
            --said image resolu---.

UNITED STATES PATENT AND TRADEMARK OFFICE
CERTIFICATE OF CORRECTION

PATENT NO. : 4,876,604
DATED : October 24, 1989
INVENTOR(S) : HIROSHI NOBUTA

Page 2 of 2

It is certified that error appears in the above-identified patent and that said Letters Patent is hereby corrected as shown below:

COLUMN 8

Line 6, "resolution" should read --resolutions--.
    Line 16, "are" should read --as--.
    Line 63, "print unit" should read --printing unit--.

Signed and Sealed this

Tenth Day of September, 1991

Attest:

HARRY F. MANBECK, JR.

*Attesting Officer*      *Commissioner of Patents and Trademarks*